June 2, 1936.　　　　　E. HALIN　　　　　2,042,936
RIVET BACKING MACHINE
Filed April 22, 1935
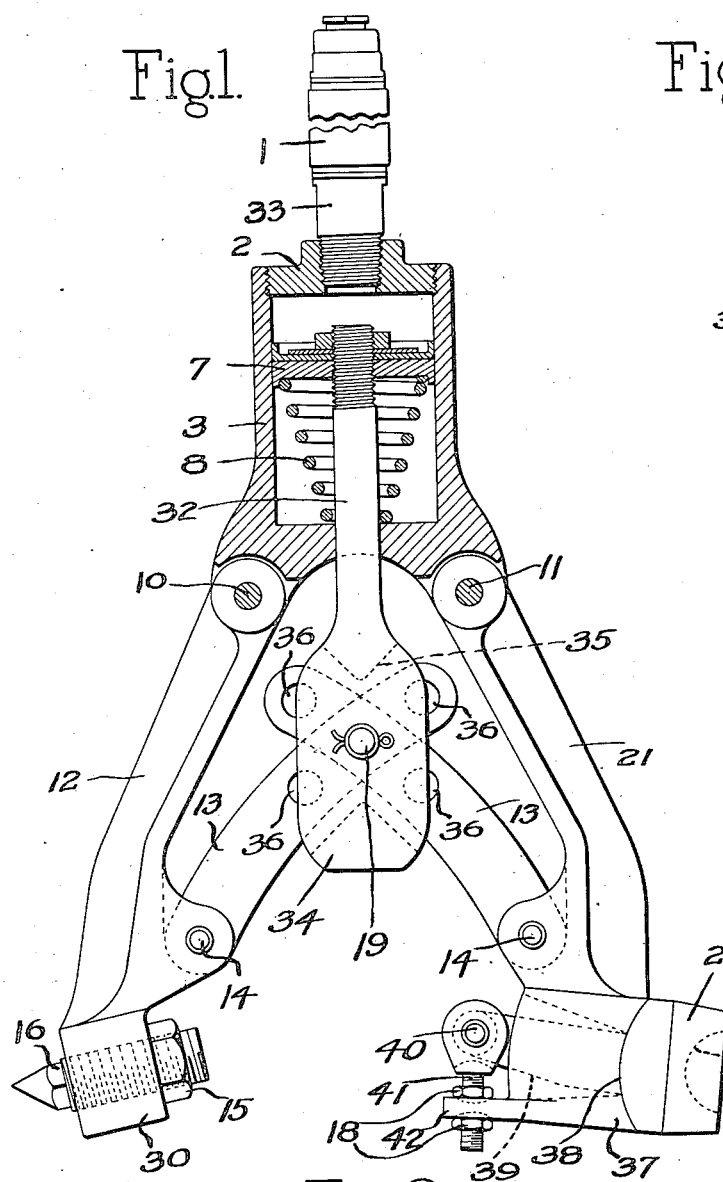
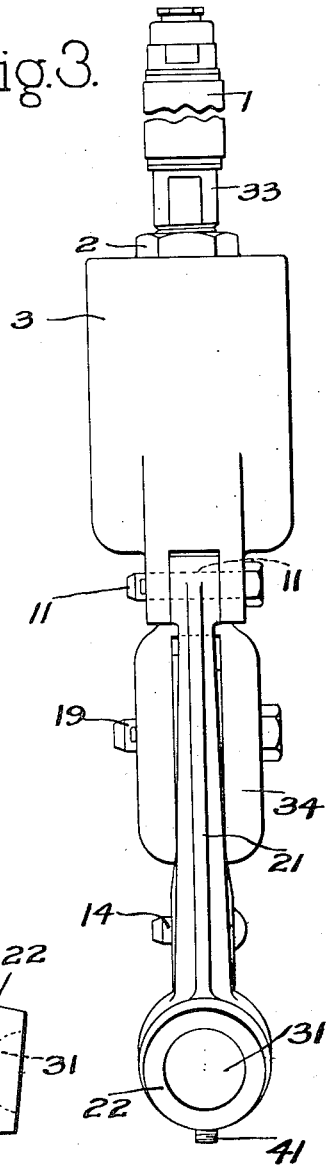
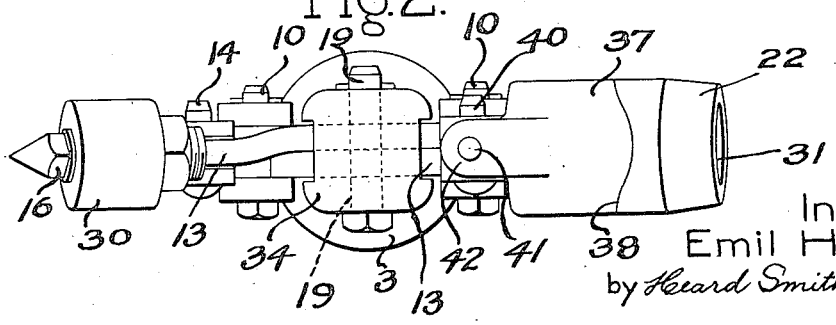
Inventor.
Emil Halin
by Heard Smith & Tennant.
Attys.

Patented June 2, 1936

2,042,936

UNITED STATES PATENT OFFICE 2,042,936

RIVET-BACKING MACHINE

Emil Halin, Quincy, Mass.

Application April 22, 1935, Serial No. 17,681

4 Claims. (Cl. 78—53.5)

The invention relates to improvements in methods now in use in backing up rivets while they are being riveted into place. In open spaces, which are easily accessible in riveting, the rivet is usually backed by a talley-bar which is a slightly bent piece of pipe with a cup shaped device on one end, which the riveter's assistant places against the hot rivet and holds it in place by applying his body pressure, while the riveter applies the riveting machine to the other end of the hot rivet and spreads the head of the rivet to make it fast into place. There are usually many places where this talley-bar cannot be used in riveting, so a device called an air-jack is used to back up the rivet. The air-jack machine is composed of a short cylinder with a piston therein and is operated by compressed air. Its length from the rivet to an opposing girder to which the air-jack rests is adjusted by threading on to the head of the air-jack the proper length of one-inch pipe. In operating the air-jack it requires the operator to hold the air-jack machine by one hand and control the air-valve with the other hand. The air-jack cannot be used in narrow spaces such as in channels due to its diameter and also due to the fact that the operator has to hold the cylinder in his hand.

One form of my invention is illustrated in the accompanying drawing in which Figure 1 is a vertical section of the entire machine; Figure 2 shows a view of the machine looking at it from the bottom; Figure 3 is a side view of the machine. Figure 1 shows the cylinder 3 with a piston 7 therein. All the parts are made of steel. An air-control handle 1 is at the top end of the cylinder 3 which regulates the entrance of compressed air into the cylinder 3 which pushes the piston 7 downward. Pivoted to the cylinder 3 at 10 are two levers 12, 21. Each lever has a connecting member 13 pivoted thereto at 14, the upper ends of the connecting members extending through an opening formed in the head 34 of a piston rod 32 which is secured to the piston. These arms 13 are pivotally connected to the head 34 by means of the pivot pin 19 and each arm has a plurality of apertures 36 through any of which the pivot pin 19 may extend. 8 indicates a spring situated within the cylinder beneath the piston 7 and which tends to raise the piston. Screw-threaded to the end 30 of the lever 12 is a cone-shaped member 16 having an off-center point adapted to engage some fixed abutment. The position of the cone may be adjusted by screwing it in or out of the end 30 and said cone may be locked in its adjusted position by the lock nut 15. At the end 37 of the lever 12 is a cup-shaped device 22 having a rivet-receiving recess 31 adapted to engage the rivet and hold it firmly while it is being riveted from the other end thereof. This cup-shaped device 22 rests against a curved seat 38 formed in the end 37 of the lever 21 and it has a stem 39 extending through an opening in the head 37. The stem 39 is pivotally connected at 40 to the head of an adjusting screw 41 that extends through the tail piece 42 of the head 37. The adjusting screw carries two lock nuts 18 by which it is locked in position. By loosening the nuts and screwing one or the other up and down the angular position of the cup-shaped device 22 can be changed so that it will press squarely on the head of the rivet.

The spread of the levers 12, 21 depends upon which of the holes 36 the pivot pin 19 occupies and the presence of these holes provides for adjusting the spread of the levers 12, 21. After the machine has been adjusted to the desired spread with the proper length cone 16, the operator turns on the air pressure with a twist of the control handle 1 and piston 7 is forced downward in cylinder 3 and the piston rod 9 pushes the arms 13 13 downward and outward which in turn force the levers 12 21 to spread outward until the cup 22 is placed firmly and squarely on the head of the hot rivet and cone 16 is resting firmly against an I-beam or some part of the frame-work being riveted.

The feature of the invention is perfectly carried out in the manner shown in Figure 1, where it will be seen that upon the application of the air pressure the piston rod 9 descends downward and forces the two arms 13 13 at the point 19 to spread the levers 12 21 outward to the point where cone 16 is firmly against a solid backing and the cup 22 is up against the hot rivet; the air is held on pressure until the rivet has been firmly riveted. The required adjustment of the spread of the levers can be partly effected by the manipulation of the bolt 19 which is easily removed and by adjusting the holes in the arms 13 13 to the desired position and reinserting bolt 19. If a longer spread is desired that is done by placing the required length cone 16 into place.

I am aware that prior to my invention the air-jack has been the only machine that I know of which has been used in backing up rivets in iron and steel construction work, but as stated before there are many instances in such construction work where it is impossible to use the air-jack as heretofore constructed on account of such narrow channels where the air-jack cannot fit into the recesses.

I claim:

1. A rivet-backing device comprising a cylinder member, two arms pivoted thereto, a rivet-backing member carried by one arm, the other arm having means to engage a fixed abutment, a piston in said cylinder member, a piston rod extending therefrom and provided with an enlarged outer end having an opening, a link pivotally connected at its outer end to each arm, the inner end of each link extending through the opening of the piston rod and having a plurality of apertures, a pivotal pin extending through the enlarged end of the piston rod and an aperture in each link to pivotally connect the link to the piston rod, and means to admit compressed air to the cylinder, the plurality of apertures in the links providing for varying the spread of the arms due to the movement of the piston.

2. A rivet-backing machine comprising a cylinder member, two arms pivoted thereto, a rivet-backing member carried by one arm, the other arm having means to engage a fixed abutment, a piston in said cylinder member, a piston rod extending therefrom, a link pivotally connected to each arm, each link having a plurality of apertures therein, and a pivotal pin extending through an aperture of each link and pivotally connecting the link to said piston rod, the plurality of apertures in each link providing for varying the spread given to the arms by the movement of the piston.

3. A rivet-backing machine comprising a cylinder member, two arms pivoted thereto, a rivet-backing member carried by the outer end of one arm, the outer end of the other arm having means to engage a fixed abutment, a piston in said cylinder member, a piston rod extending therefrom, a link pivotally connected to each arm adjacent its outer end and extending inwardly toward the cylinder, means pivotally connecting said links to the piston rod, and means to admit compressed air to the cylinder.

4. A rivet-backing machine comprising a cylinder member, two arms pivoted thereto, one of which has a curved seat portion, a rivet-backing member resting against said curved seat portion, the other arm having means to engage a fixed abutment, means to shift the angular position of the rivet-backing member on its curved seat, a piston in the cylinder, and a connection between the piston and the arms by which the arms are spread as the piston moves downwardly.

EMIL HALIN.